(12) United States Patent
Gould et al.

(10) Patent No.: US 6,935,118 B2
(45) Date of Patent: Aug. 30, 2005

(54) EXHAUST NOZZLE SEGMENTED BASESHEET AND PRODUCTION METHOD THEREOF

(75) Inventors: Kenneth Arthur Gould, Middleton, MA (US); Stephen Russell Burnham, Danvers, MA (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 10/740,930

(22) Filed: Dec. 19, 2003

(65) Prior Publication Data

US 2005/0132709 A1    Jun. 23, 2005

(51) Int. Cl.[7] ............................................... F02K 1/06
(52) U.S. Cl. ................. 60/771; 239/265.37; 29/890.01
(58) Field of Search ............ 60/770, 771; 239/265.11, 239/265.33, 265.37, 265.43; 29/890.01

(56) References Cited

U.S. PATENT DOCUMENTS

| | | | |
|---|---|---|---|
| 5,261,605 A | * 11/1993 | McLafferty et al. ... | 239/265.35 |
| 5,584,173 A | * 12/1996 | Lybarger ..................... | 60/797 |
| 5,667,140 A | 9/1997 | Johnson et al. | |
| 5,779,152 A | * 7/1998 | Renggli et al. ........ | 239/265.33 |
| 6,148,608 A | * 11/2000 | Martin et al. .................. | 60/232 |
| 2003/0145599 A1 | 8/2003 | Renggli et al. | |
| 2003/0145600 A1 | 8/2003 | Senile et al. | |

OTHER PUBLICATIONS

"Solid Works Express", SolidWorks Community News, http://www.solidworks.com, Dec. 2003, 3 pages.

* cited by examiner

Primary Examiner—Ehud Gartenberg
(74) Attorney, Agent, or Firm—William Scott Andes; Steven J. Rosen

(57) ABSTRACT

A basesheet for use in an aircraft gas turbine engine exhaust nozzle includes a plurality of basesheet segments extending between longitudinally extending spaced apart basesheet leading and trailing edges, respectively, of the basesheet. Right and left hand basesheet side edges, respectively, extend longitudinally between the basesheet leading and trailing edges. Each basesheet segment has a panel body defined between a pair of segment side edges longitudinally extending between segment leading and trailing edges, respectively. Stiffeners having leading and trailing edge ribs at the segment leading and trailing edges of aft and forward ones of the basesheet segments, respectively, extend widthwise across the panel body between the segment side edges. The leading and trailing edge ribs are joined together only at intermediate sections of the stiffeners which are centered between left and right hand expansion sections, respectively, of the stiffener.

17 Claims, 4 Drawing Sheets

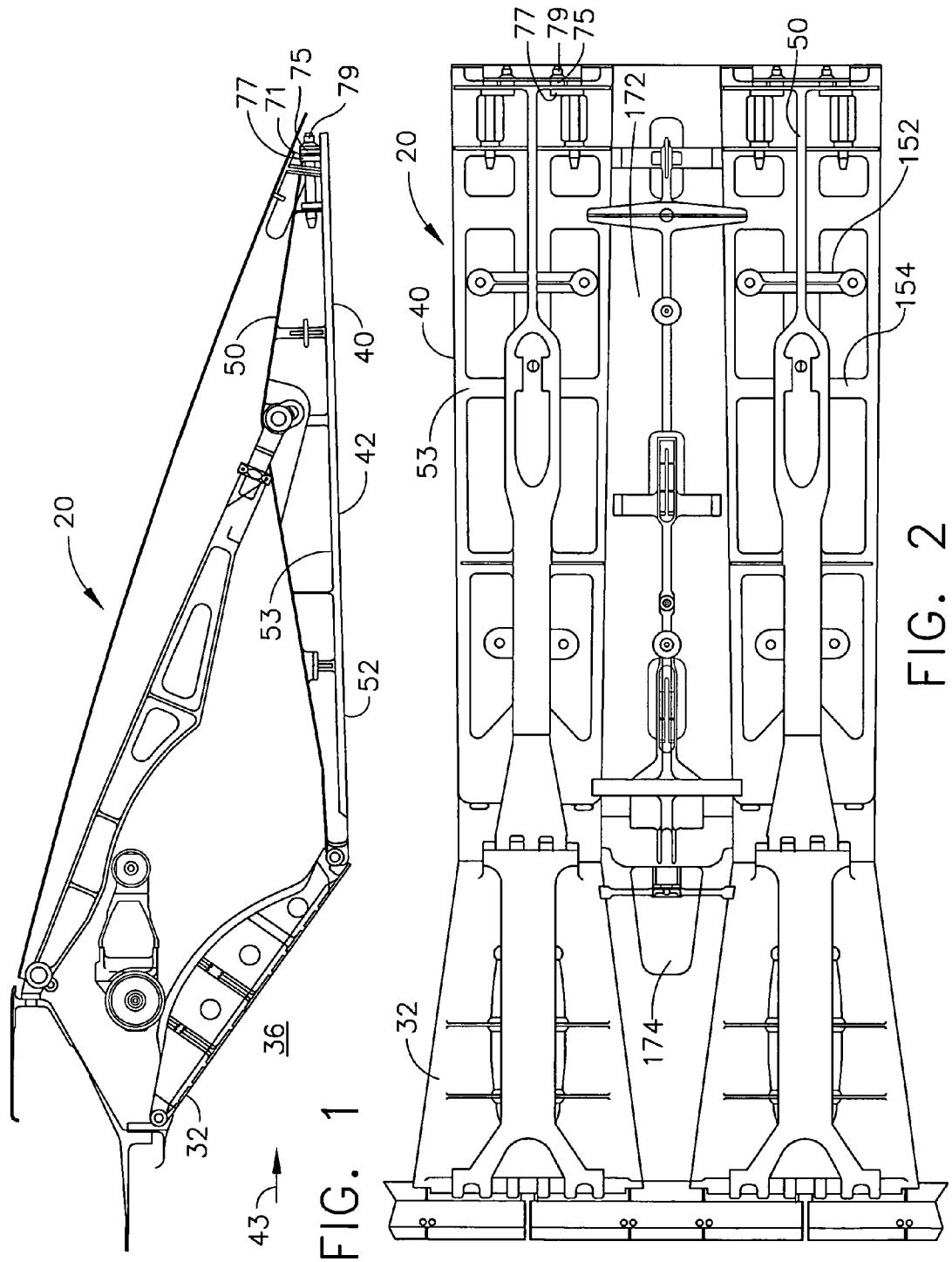

EXHAUST NOZZLE SEGMENTED BASESHEET AND PRODUCTION METHOD THEREOF

BACKGROUND OF THE INVENTION

1. Field of the Invention

This invention relates generally to gas turbine engine nozzles and, more particularly, to methods and apparatus for sealing gas turbine engine nozzles with segmented flap basesheets.

2. Description of Related Art

Military aircraft gas turbine engines often include variable geometry exhaust nozzles. The variable geometry exhaust nozzle varies throat and exit areas of the exhaust nozzle using flaps and seals. Examples of such engines are the General Electric F110 and the F414. The flaps and seals define the flowpath and the seals as their name implies seal against adjacent flaps. Because the exhaust nozzles are subjected to high temperatures and thermal gradients as a result of hot combustion gases exiting the engine, the variable geometry nozzle must maintain a coherent flowpath while shielding nozzle structural components.

Diverging flaps incorporating backbones to secure the basesheets have been used for the divergent section of convergent/divergent variable geometry nozzles. Accordingly, a center portion of each flap basesheet is unshielded and exposed to the combustion gases. During engine operation, the flap basesheet edges are exposed to less heat than the center portion of the basesheet, and as a result, a circumferential thermal gradient may be induced to the basesheet. Continued operation with the thermal gradient may induce thermal stresses into the basesheet which over time, may lead to warping, thermally induced distortion, cracking, or premature failure of the flaps.

To facilitate reducing thermal stresses induced to the flaps, at least some known engines include a "floating" basesheet design. More specifically, within such designs, a unitary basesheet is used to establish a portion of the flowpath. Because the basesheet is not rigidly joined to the backbone, the basesheet may thermally expand more than the backbone, thus facilitating reducing thermal gradients in comparison to designs having basesheets that are attached rigidly to or formed integrally with the backbone. However, because the center portion of the associated flap basesheets are still exposed to the hot combustion gases, thermal gradients between the basesheet edges and basesheet center portion may cause warping, cracking, or thermally induced distortion within the flap assembly.

One known flap incorporates a longitudinally segmented basesheet design having a central portion connected to the edge portions by channels which are crimped on the basesheet. The channels extend across and are attached to a backside of the basesheet and facilitate reducing thermally induced stresses by permitting differential thermal growth of the predominately cold portion of the seal assembly and the predominately hot portion of the segmented basesheet. However, aligning the basesheets while attaching the channel to the backside of the basesheets may be time consuming. Furthermore, because the channel is attached across the basesheet and between the edges of the basesheet, continued thermal cycling may create local stress concentrations between the channel and the basesheet.

A method for assembling a gas turbine engine variable exhaust nozzle having flaps with backbone and basesheet assemblies is disclosed in U.S. patent application Ser. No. 10/061,618, entitled "Methods and Apparatus for Sealing Gas Turbine Engine Nozzles", filed Feb. 1, 2002, and published Aug. 7, 2003. The method includes providing a flap basesheet having a width defined between a pair of side edges extending between a leading edge and a trailing edge. At least one stiffener extends between the basesheet side edges and includes an intermediate portion that has a width that is smaller than that of the basesheet. The stiffener is bonded to or formed integrally with the basesheet. The basesheet is mounted to the gas turbine engine exhaust nozzle with a backbone assembly. Other embodiments are described in the publication.

BRIEF SUMMARY OF THE INVENTION

A basesheet for use in a flap of a gas turbine engine exhaust nozzle includes a plurality of basesheet segments extending between basesheet longitudinally extending spaced apart basesheet leading and trailing edges, respectively, of the basesheet. Right and left hand basesheet side edges, respectively, extending longitudinally between the basesheet leading and trailing edges. Each basesheet segment includes a panel body defined between a pair of segment side edges longitudinally extending between segment leading and trailing edges, respectively. Stiffeners having leading and trailing edge ribs at the segment leading and trailing edges of aft and forward ones of the basesheet segments, respectively, extend widthwise across the panel body. The leading and trailing edge ribs are joined together only at intermediate sections of the stiffeners centered between left and right hand expansion sections, respectively, of the stiffener. Forwardly extending side trailing edge flanges of the trailing edge ribs in the left and right hand expansion sections of the stiffeners are connected substantially parallel to the panel bodies of the basesheet segments by a hem at the segment leading edges. Forwardly extending side leading edge flanges of the leading edge ribs in the left and right hand expansion sections of the stiffeners are connected substantially parallel to the panel bodies of the basesheet segments by jogs in the leading edge ribs at the segment leading edges. The side leading edge flanges have rolled over tabs bent inwardly towards the panel bodies.

The exemplary embodiment of the basesheet includes each of the stiffeners having a forwardly extending intermediate trailing edge flange of the trailing edge rib in the intermediate section of the stiffener connected, so as to be substantially parallel to the panel body of the forward basesheet segment, by the hem. A forwardly extending intermediate leading edge flange of the leading edge rib in the intermediate section of the stiffener is connected substantially parallel to the panel body by a jog at the segment leading edge of the aft basesheet segment. The leading edge and trailing edge ribs of each stiffener are joined together only along the intermediate trailing and leading edge flanges. The intermediate trailing and leading edge flanges are resistance welded together with spot welds centered on the intermediate trailing and leading edge flanges.

An exemplary method of forming the stiffeners includes resistance welding together each pair of adjacent ones of the intermediate trailing and leading edge flanges by placing the copper shunt between and contacting both the intermediate trailing edge flange and the panel body to which the intermediate trailing edge flange is connected by the hem. Then pressing a first electrode against the intermediate leading edge flange, pressing a second electrode against the intermediate trailing and leading edge flanges, and using the electrodes to weld the pair of intermediate trailing and leading edge flanges together. The resistance welding may be resistance spot welding.

A more general application of the resistance welding method can be applied to joining first and second sheet metal elements using the copper shunt between and in contact with the first sheet metal element and a third sheet metal element. The third sheet metal element being spaced apart from and connected to the first sheet metal element. A second sheet metal element is placed in contact with the first sheet metal element along an interface between the first and second sheet metal elements. The first electrode is pressed against the second sheet metal element and the second electrode is pressed against the first sheet metal element. The welding current is passed between the electrodes through the copper shunt, thus, welding the first and second sheet metal elements together along the interface.

BRIEF DESCRIPTION OF THE DRAWINGS

The foregoing aspects and other features of the invention are explained in the following description, taken in connection with the accompanying drawings where:

FIG. 1 is a cross-sectional schematic view illustration of a gas turbine engine variable exhaust nozzle.

FIG. 2 is a top view illustration of flaps and a seal in the nozzle illustrated in FIG. 1.

DETAILED DESCRIPTION OF THE INVENTION

Figure 3:
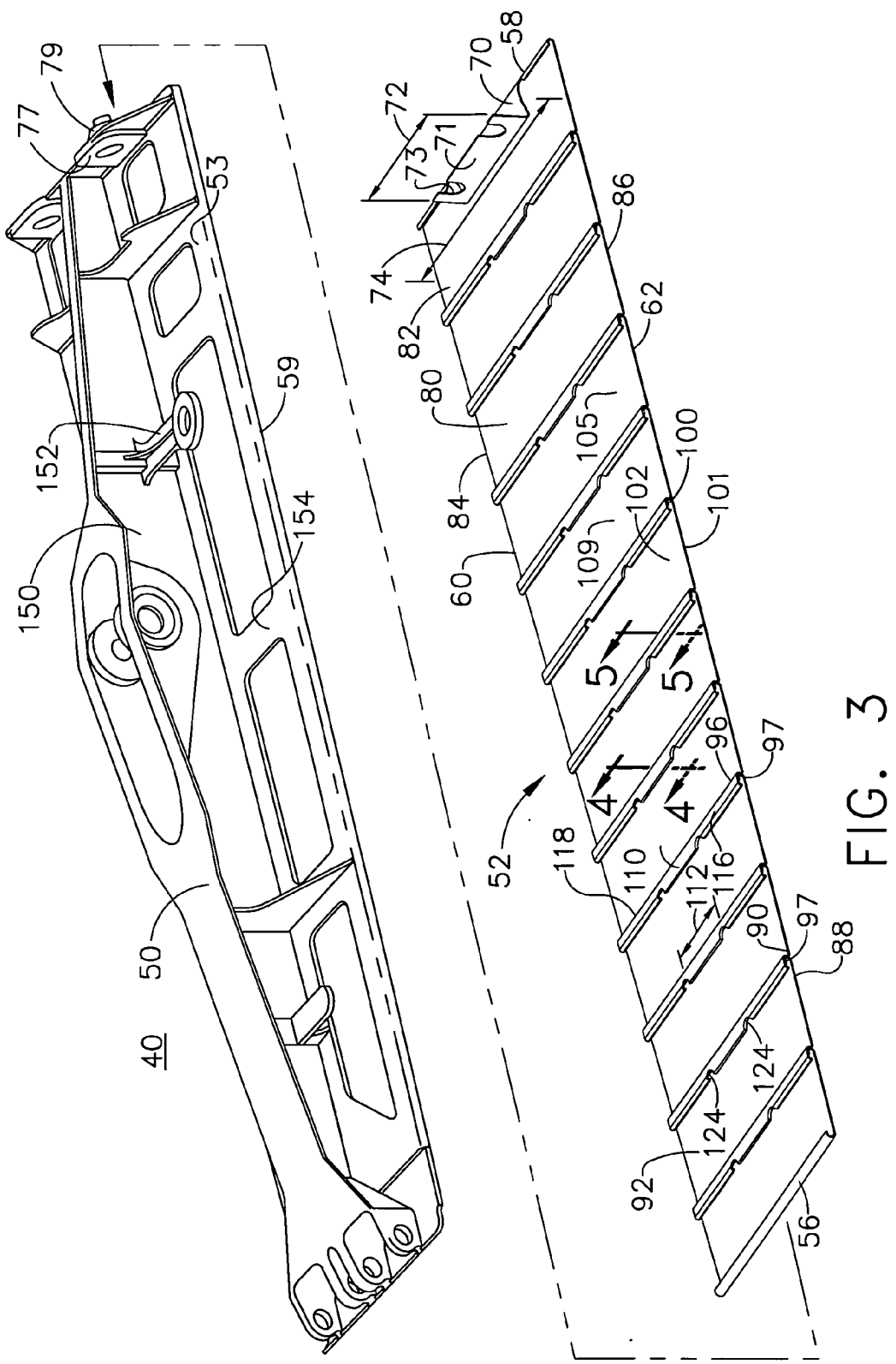
FIG. 3 is an exploded perspective view illustration of a backbone and basesheet of the divergent flap illustrated in FIGS. 1 and 2.

Illustrated in FIGS. 1 and 2 is a gas turbine engine variable geometry exhaust nozzle 20 including convergent flaps 32 and seals 174 and divergent flaps 40 and seals 172. Flowpath sides 42 of the divergent flaps 40 are exposed to hot exhaust gases 43 exiting the exhaust nozzle 20 and, thus, flowpath sides 42 define a portion of a flowpath 36 through the nozzle.

Illustrated in FIG. 3 is a partially exploded view of the divergent flap 40 which includes a longitudinally extending backbone 50 supporting a frame 53 for holding a removable basesheet 52. The basesheet 52 is constructed from a plurality of basesheet segments 80 connected together. The frame 53 is more particularly illustrated in cross-section in FIG. 6. The frame 53 supports a widthwise extending out-rigger 152 and includes longitudinally extending axial ribs 150. The cross-ribs 154 extend widthwise outwardly from the extending axial rib 150 of the frame 53. The basesheet 52 has right and left hand basesheet side edges 60 and 62, respectively, extending longitudinally between spaced apart basesheet leading and trailing edges 56 and 58.

Figure 6:
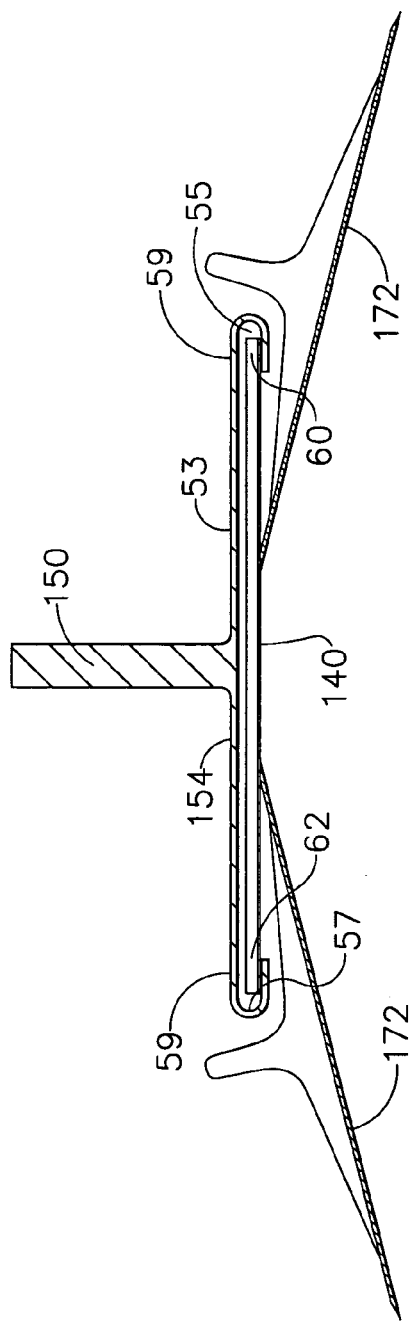
FIG. 6 is a cross-sectional schematic view illustration of the flap with the basesheet and two adjacent seals of the nozzle illustrated in FIGS. 1 and 2.

The basesheet 52 is slidably mounted to the frame 53 by the right and left hand basesheet side edges 60 and 62 as more particularly illustrated in FIG. 6. The right and left hand basesheet side edges 60 and 62 slidingly engage longitudinally extending frame slots 55 of rails 57 along frame side edges 59 of the frame 53 which are supported by the cross-ribs 154. During assembly, the basesheet 52 is slid into the frame slots 55 of the rails 57. In the exemplary embodiment, the basesheet side edges 60 and 62 are tapered inwardly in the forward or upstream direction from the basesheet trailing edge 58 to the basesheet leading edge 56 such that the basesheet trailing edge 58 is wider than the basesheet leading edge 56. Alternatively, the basesheet side edges 60 and 62 may be substantially parallel, and the basesheet leading and trailing edges 56 and 58, respectively, may be substantially parallel, and substantially perpendicular with respect to the basesheet side edges 60 and 62.

The basesheet trailing edge 58 includes an aft retaining bend 70 on an aftmost basesheet segment 82. A retaining flange 71 of the retaining bend 70 is bent so as to be substantially normal to the basesheet 52. The retaining flange 71 includes retainer slots 73 which are used to secure the basesheet 52 to the frame 53 of the backbone 50. In the exemplary embodiment, the retaining bend 70 and the retaining flange 71 are formed integrally with the aftmost basesheet segment 82 of the basesheet 52. The retaining bend 70 has a retaining bend width 72 that is less than a basesheet width 74 between the basesheet side edges 60 and 62 of basesheet 52.

In the exemplary embodiment of the basesheet 52, the basesheet segments 80 are identical except for the aftmost basesheet segment 82 which includes the basesheet trailing edge 58 and the retaining flange 70. The basesheet segments 80 are fabricated from a metallic material in the embodiment illustrated herein, but may otherwise be fabricated from different materials such as a silicon-carbon graphite material. The basesheet segments 80 are connected together, as described below, and extend between the basesheet leading and trailing edges 56 and 58, respectively, and between basesheet side edges 60 and 62.

Each basesheet segment 80 has a panel body 92 defined between a pair of right and left hand segment side edges 84 and 86 longitudinally extending between segment leading and trailing edges 88 and 90, respectively. In the exemplary embodiment, the panel body 92 is tapered inwardly as is the basesheet 52, the segment side edges 84 and 86 are angled inwardly, and the segment leading and trailing edges 88 and 90 are substantially parallel. Furthermore, in the exemplary embodiment, edges 88 and 90 are substantially perpendicular to the segment side edges 84 and 86. A leading edge rib 96 is formed integrally with the panel body 92 at the segment leading edge 88 and extends widthwise across the panel body 92 between the segment side edges 84 and 86. The leading edge rib 96 is bent over.

A bent over trailing edge rib 97 having a segment channel 100 is integrally formed with the panel body 92 at the basesheet segment trailing edge 90 and extends widthwise across panel body 92 between the segment side edges 84 and 86. The channel 100 is semi-circular and, thus, substantially arcuate such that channel 100 has a curved cross-section 103 that enables the channel 100 to conform to the leading edge rib 96. Each segment panel body 92 has a flowpath side 101 that is adjacent the nozzle exhaust flowpath, and a back side 102 that is between flowpath side 101 and backbone 50. The channel 100 is contoured to mate against an adjacent one of the leading edge ribs 96 to form a stiffener 106 that extends widthwise across panel body 92. The leading edge and trailing edge ribs 96 and 97 provide increased structural integrity of each respective basesheet segment 80 and the stiffener 106 is designed to prevent the basesheet 52 from warping and also prevents vibrations by providing a tight fit in the frame slots 55 of the rails 57.

Adjacent basesheet segments 80 are securely connected together to form the basesheet 52 and to form the stiffeners 106. Adjacent basesheet segments 80 are connected at the stiffeners 106. Aft and forward ones 105 and 109 of the adjacent basesheet segments 80 are welded, brazed, or otherwise joined or bonded together at the stiffeners 106. The adjacent basesheet segments 80 are bonded together only at an intermediate section 110 of each of the stiffeners 106. Bonding of the basesheet segments 80 at the intermediate sections 110 forms a basesheet 52 that is contiguous through the intermediate sections 110.

Figure 5:
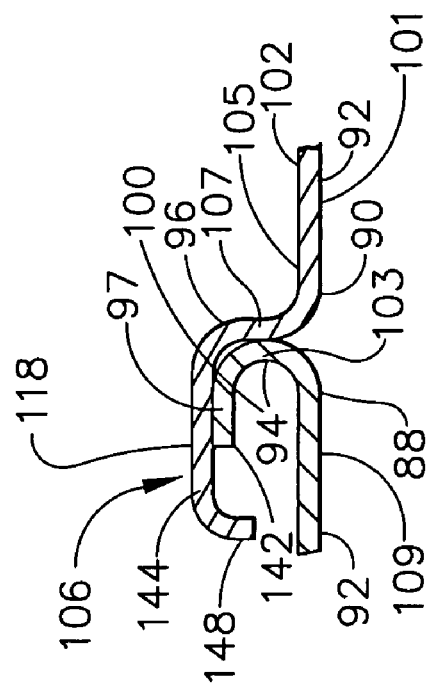
FIG. 5 is a cross-sectional view illustration of an expansion section of the stiffener of the basesheet illustrated and taken along line 5—5 in FIG. 3.
Figure 4:
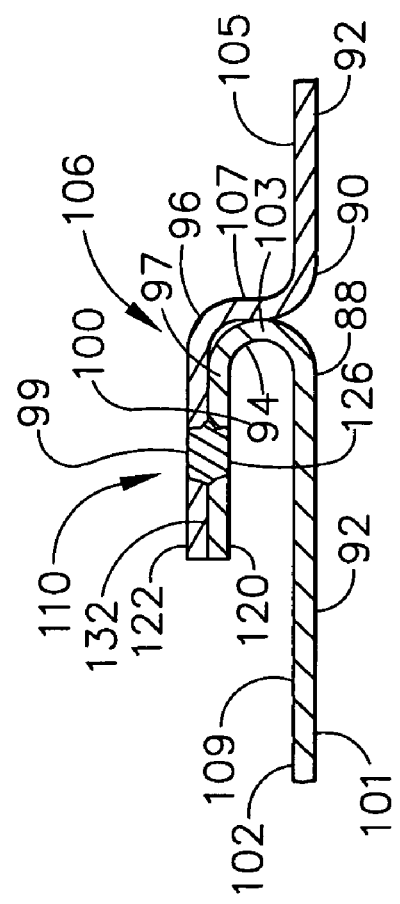
FIG. 4 is a cross-sectional view illustration of an intermediate section of a stiffener of the basesheet illustrated and taken along line 4—4 in FIG. 3.

Each stiffener intermediate section 110 has a width 112 that is smaller than basesheet width 74. In the exemplary embodiment, stiffener intermediate section width 112 is approximately equal one third of basesheet assembly width 74. The intermediate section 110 is centered between left and right hand expansion sections 116 and 118, respectively, of the stiffener 106. The left and right hand expansion sections 116 and 118 extend between the right and left hand basesheet side edges 60 and 62, respectively, and the intermediate section 110. The intermediate section 110 is delineated from the left and right hand expansion sections 116 and 118, respectively, by rounded notches 124. The intermediate section 110 is constructed differently than the left and right hand expansion sections 116 and 118, respectively, of the stiffener 106 as illustrated in FIGS. 4 and 5. Cross-sections of the intermediate section 110 are illustrated in FIG. 4 and the left and right hand expansion sections 116 and 118 are illustrated in FIG. 5.

The bent over trailing edge rib 97 in the intermediate section 110 has a segment channel 100. The leading edge rib 96 is formed integrally with the segment leading edge 88 and extends widthwise across the panel body 92 between the segment side edges 84 and 86. The leading edge rib 96 is bent over and, in the embodiment illustrated herein, has a substantially semi-circular annular cross-section. Rib 96 facilitates increasing a structural integrity of each respective basesheet segment 80.

A bent over trailing edge rib 97 having a segment channel 100 is integrally formed with the basesheet segment trailing edge 90 and extends widthwise across panel body 92 between the segment side edges 84 and 86. The channel 100 is substantially arcuate such that channel 100 has a curved cross-section 103 that enables the channel 100 to conform to the leading edge rib 96. Each segment panel body 92 has a flowpath side 101 that is adjacent the nozzle exhaust flowpath, and a back side 102 that is between flowpath side 101 and backbone 50. The channel 100 is contoured to mate against an adjacent one of the leading edge ribs 96 to form a stiffener 106 that extends widthwise across panel body 92. The stiffener 106 is designed to prevent the basesheet 52 from warping and also prevents vibration by providing a tight fit in the frame slots 55 of the rails 57.

The bent over trailing edge rib 97 in the intermediate section 110 of the stiffener 106 has a forwardly extending intermediate trailing edge flange 120 connected, so as to be substantially parallel to the panel body 92 of the basesheet segment 80, by a hem 94 at the segment trailing edge 90. The leading edge rib 96 in the intermediate section 110 of the stiffener 106 has a forwardly extending intermediate leading edge flange 122 connected substantially parallel to the panel body 92 of the basesheet segment 80 by a jog 107 at the segment leading edge 88. The intermediate trailing edge flange 120 is parallel to and substantially in contact with the intermediate leading edge flange 122 because the channel 100 of the trailing edge rib 97 conforms to the leading edge rib 96. This design allows the intermediate trailing and leading edge flanges 120 and 122 to be joined or bonded together, such as by welding or brazing, only at the intermediate trailing and leading edge flanges 120 and 122. The leading edge and trailing edge ribs 96 and 97 of each stiffener 106 are joined together only along the intermediate trailing and leading edge flanges 120 and 122. The embodiment of the basesheet 52 illustrated herein has 3 spot welds 99 centered on the intermediate trailing and leading edge flanges 120 and 122.

Figure 7:
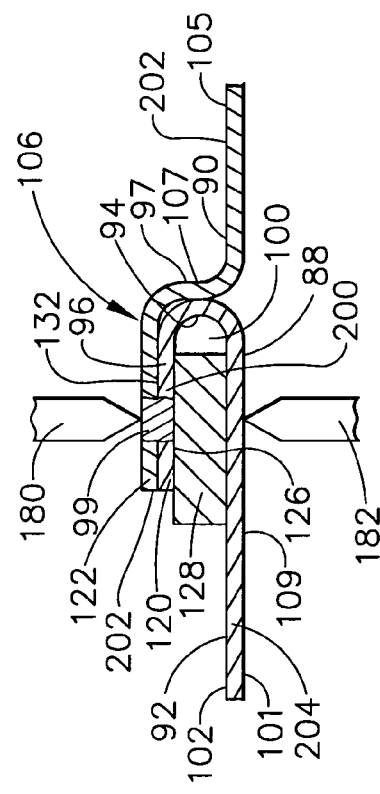
FIG. 7 is a cross-sectional view of illustration of a copper shunt being used for welding together intermediate trailing and leading edge flanges of adjacent basesheet segments at an intermediate section of the stiffener illustrated in FIG. 3.

Welding of the intermediate trailing edge flange 120 to the intermediate leading edge flange 122 in the middle of the two intermediate flanges is very difficult, if not impossible, because the channel 100 of the trailing edge rib 97 is very small and an electrode cannot be well positioned to contact a middle 126 of the intermediate trailing edge flange 120. Illustrated in FIG. 7 is a copper shunt 128 that is positioned between the intermediate trailing edge flange 120 and the panel body 92 at the basesheet segment trailing edge 90 before welding together the intermediate trailing and leading edge flanges 120 and 122. The copper shunt 128 remains between the intermediate trailing and leading edge flanges 120 and 122 during welding providing an electron path to the interface 132 between the flanges and also providing pressure and, thus, good contact between the flanges at the interface.

A method for making a gas turbine engine exhaust nozzle basesheet 52 includes forming a plurality of the basesheet segments 80. The leading and trailing edge ribs 96 and 97 are formed at the segment leading and trailing edges 88 and 90 of aft and forward ones 105 and 109 of the basesheet segments 80, respectively, extending widthwise across the panel body 92 between the segment side edges 84 and 86 as illustrated in FIG. 2. The forwardly extending intermediate trailing edge flanges 120 are formed between the pairs of the forwardly extending side trailing edge flanges 142 of the trailing edge ribs 97 as illustrated in FIGS. 4 and 5. The forwardly extending intermediate trailing edge flanges 120 are formed connected substantially parallel to the panel bodies 92 of the respective basesheet segments 80 by hems 94. The forwardly extending intermediate leading edge flanges 122 as illustrated in FIG. 4 are formed between pairs of the forwardly extending side leading edge flanges 144 of the leading edge ribs 96 as illustrated in FIGS. 2 and 5. The forwardly extending intermediate leading edge flanges 122 are formed connected substantially parallel to the panel bodies 92 of the respective basesheet segments 80 by the jogs 107. The leading edge and trailing edge ribs 96 and 97 are welded together only along the intermediate trailing and leading edge flanges 120 and 122 as illustrated in FIG. 7.

The intermediate trailing and leading edge flanges 120 and 122 are welded together by resistance welding, and in the exemplary embodiment illustrated herein, by resistance spot welding. Each pair of the intermediate trailing and leading edge flanges 120 and 122 are welded together by placing the copper shunt 128 between and contacting both the intermediate trailing edge flange 120 and the panel body 92 to which the intermediate trailing edge flange 120 is connected by the hem 94. The method further includes pressing a first electrode 180 against the intermediate leading edge flange 122, pressing a second electrode 182 against the intermediate trailing and leading edge flanges 120 and 122, and using the electrodes to weld the pair of intermediate trailing and leading edge flanges 120 and 122 together. The resistance welding may be resistance spot welding. The method may include, before the resistance welding, forming the rolled over tabs 148 of the side leading edge flanges 144. The rolled over tabs 148 are bent inwardly towards the panel bodies 92.

A more general application of the resistance welding method can be applied to joining first and second sheet metal elements 200 and 202 together as also illustrated in FIG. 7. The copper shunt 128 is placed between and in contact with the first sheet metal element 200 and a third sheet metal element 204. The third sheet metal element 204 being spaced apart from and connected to the first sheet metal element 200. A second sheet metal element 202 is placed in contact with the first sheet metal element 200 along an interface 132 between the first and second sheet metal elements 200 and 202. The first electrode 180 is pressed against the second sheet metal element 202 and the second electrode 182 is pressed against the first sheet metal element 200. The welding current is passed between the electrodes through the copper shunt, thus, welding the first and second sheet metal elements 200 and 202 together along the interface 132.

In the left and right hand expansion sections 116 and 118 of the stiffener 106, the trailing edge rib 97 has forwardly extending side trailing edge flanges 142 connected substantially parallel to the panel body 92 of the basesheet segment 80 by the hem 94. In the left and right hand expansion sections 116 and 118 of the stiffener 106, the leading edge rib 96 has forwardly extending side leading edge flanges 144 connected substantially parallel to the panel body 92 of the basesheet segment 80 by the jog 107 in the leading edge rib 96 at the segment leading edge 88. The side trailing edge flanges 142 are parallel to and substantially in contact with the side leading edge flanges 144 because the channel 100 of the trailing edge rib 97 conforms to the leading edge rib 96.

The side trailing and leading edge flanges 142 and 144 are not bonded together and are thus free to expand and contract substantially independently of each other. The side trailing edge flanges 142 are substantially shorter than the side leading edge flanges 144. This allows the side leading edge flanges 144 to have rolled over tabs 148 that are bent inwardly towards the panel body 92 at the basesheet segment trailing edge 90. The rolled over tabs 148 shields sharp edges of the stiffener 106 from the support structure of the frame such as the cross-ribs 154 of the frame 53 during installation and removal. The rolled over tabs 148 shields prevent the side leading edge flanges 144 from catching on the cross-ribs 154, while the basesheet 52 is slid into the frame slots 55 of rails 57 along the frame side edges 59 of the frame 53, which are supported by the cross-ribs 154 during installation and removal.

During assembly of the divergent flap 40, after the basesheet 52 is assembled and slid into the frame slots 55. The basesheet 52 is secured to the backbone 50 by the retaining flange 70 having retaining slots 73 therethrough. Frame studs 79 extend aftwardly from an aft frame flange 77 that is normal to the frame 53. The frame studs 79 extend through the retaining slots 73. The retaining flange 70 is trapped between the aft frame flange 77 and a retainer 75 which is secured to the frame studs 79. As the basesheet 52 is assembled, adjacent basesheet segments 80 are positioned such that a leading basesheet segment trailing edge channel 100 is mated against a trailing basesheet segment leading edge rib 96 to form stiffener 106. The intermediate trailing and leading edge flanges 120 and 122 are then joined or bonded together, using for example welding or brazing, and the left and right hand expansion sections 116 and 118 remain in contact but not bonded or otherwise secured to each other.

The basesheet 52 is then mounted to backbone 50 and positioned such that the divergent flap 40 extends in an overlapping fashion between a pair of adjacent exhaust nozzle variable geometry divergent seals 172 as illustrated in FIGS. 2 and 6. Each basesheet 52 forms a portion of the exhaust flowpath through the engine, such that adjacent basesheet edges 60 and 62, facilitate shielding exhaust nozzle flap backbone 50 from hot combustion gases exiting the engine. A center portion 140 of each basesheet 52 is exposed directly to hot combustion gases exiting the exhaust nozzle. The basesheet's center portion 140 extends axially between the basesheet leading and trailing edges 56 and 58, respectively, along the contiguous portion formed by stiffener intermediate portions. Additionally, the areas of basesheet 52 adjacent to the exposed center portion 140 and bounded by either edge 60 or 62 are substantially shielded from the hot combustion gases.

During operation, basesheet assembly center portion 140 is exposed directly to hot combustion gases exiting the engine and as a result, basesheet assembly center portion 140 may thermally expand more than portions of basesheet 52 adjacent basesheet side edges 60 and 62 which are exposed to lower temperatures. As the center portion 140 thermally expands, the left and right hand expansion sections 116 and 118 may separate, thus, facilitating reducing thermally induced strains and stresses into basesheet 52 and flap 40.

Each stiffener 106 includes an intermediate section that has a width that is less than the basesheet 52. A pair of expansion sections extend between the intermediate section and each respective basesheet assembly side. Thus, the basesheet is only contiguous through the intermediate sections of the stiffeners and as such, during operation, the expansion sections may separate and reduce thermal stresses induced to the basesheet. This extends the useful life of basesheet and results in the gas turbine engine variable geometry flap and nozzle being more cost-effective and reliable than other designs.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An aircraft gas turbine engine exhaust nozzle basesheet comprising:

a plurality of basesheet segments extending between longitudinally extending spaced apart basesheet leading and trailing edges, respectively, of the basesheet, right and left hand basesheet side edges, respectively, extending longitudinally between the basesheet leading and trailing edges, each basesheet segment having a panel body defined between a pair of segment side edges longitudinally extending between segment leading and trailing edges, respectively, stiffeners comprising leading and trailing edge ribs at the segment leading and trailing edges of aft and forward ones of the basesheet segments, respectively, extending widthwise across the panel body between the segment side edges, the leading and trailing edge ribs joined together only at intermediate sections of the stiffeners centered between left and right hand expansion sections, respectively, of the stiffener, forwardly extending side trailing edge flanges of the trailing edge ribs in the left and right hand expansion sections of the stiffeners connected substantially parallel to the panel bodies of the basesheet segments by a hem at the segment leading edges, forwardly extending side leading edge flanges of the leading edge ribs in the left and right hand expansion sections of the stiffeners connected substantially parallel to the panel bodies of the basesheet segments by jogs in the leading edge ribs at the segment leading edges, and the side leading edge flanges having rolled over tabs bent inwardly towards the panel bodies.

2. A basesheet as claimed in claim 1 further comprising in each of the stiffeners:

a forwardly extending intermediate trailing edge flange of the trailing edge rib in the intermediate section of the stiffener connected, so as to be substantially parallel to the panel body of the forward basesheet segment, by the hem, a forwardly extending intermediate leading edge flange of the leading edge rib in the intermediate section of the stiffener connected substantially parallel to the panel body by a jog at the segment leading edge of the aft basesheet segment, and the leading edge and trailing edge ribs of each stiffener being joined together only along the intermediate trailing and leading edge flanges.

3. A basesheet as claimed in claim 2 wherein the intermediate trailing and leading edge flanges are welded together.

4. A basesheet as claimed in claim 3 wherein the intermediate trailing and leading edge flanges are welded together with spot welds centered on the intermediate trailing and leading edge flanges.

5. A basesheet as claimed in claim 4 wherein there are at least three of the spot welds.

6. An aircraft gas turbine engine exhaust nozzle flap comprising:

a longitudinally extending backbone having a frame, longitudinally extending rails including frame slots disposed along frame side edges of the frame supported by widthwise extending cross-ribs of the frame, a basesheet removably supported by the rails, the basesheet comprising a plurality of basesheet segments extending between basesheet longitudinally extending spaced apart basesheet leading and trailing edges, respectively, of the basesheet, right and left hand basesheet side edges, respectively, extending longitudinally between the basesheet leading and trailing edges and slidably supported within the frame slots of the rails, each basesheet segment having a panel body defined between a pair of segment side edges longitudinally extending between segment leading and trailing edges, respectively, stiffeners comprising leading and trailing edge ribs at the segment leading and trailing edges of aft and forward ones of the basesheet segments, respectively, extending widthwise across the panel body between the segment side edges, the leading and trailing edge ribs joined together only at intermediate sections of the stiffeners centered between left and right hand expansion sections, respectively, of the stiffener, forwardly extending side trailing edge flanges of the trailing edge ribs in the left and right hand expansion sections of the stiffeners connected substantially parallel to the panel bodies of the basesheet segments by a hem at the segment leading edges, forwardly extending side leading edge flanges of the leading edge ribs in the left and right hand expansion sections of the stiffeners connected substantially parallel to the panel bodies of the basesheet segments by jogs in the leading edge ribs at the segment leading edges, and the side leading edge flanges having rolled over tabs bent inwardly towards the panel bodies.

7. A flap as claimed in claim 6 further comprising in each of the stiffeners:

a forwardly extending intermediate trailing edge flange of the trailing edge rib in the intermediate section of the stiffener connected, so as to be substantially parallel to the panel body of the forward basesheet segment, by the hem, a forwardly extending intermediate leading edge flange of the leading edge rib in the intermediate section of the stiffener connected substantially parallel to the panel body by a jog at the segment leading edge of the aft basesheet segment, and the leading edge and trailing edge ribs of each stiffener being joined together only along the intermediate trailing and leading edge flanges.

8. A flap as claimed in claim 7 wherein the intermediate trailing and leading edge flanges are welded together.

9. A flap as claimed in claim 8 wherein the intermediate trailing and leading edge flanges are welded together with spot welds spaced widthwise apart along a centerline of the intermediate trailing and leading edge flanges.

10. A flap as claimed in claim 9 wherein there are at least three of the spot welds.

11. A method for making a gas turbine engine exhaust nozzle basesheet comprising:

forming a plurality of basesheet segments, each of the basesheet segments having a panel body defined between a pair of segment side edges longitudinally extending between segment leading and trailing edges, respectively, forming leading and trailing edge ribs at the segment leading and trailing edges of aft and forward ones of the basesheet segments, respectively, extending widthwise across the panel body between the segment side edges, forming forwardly extending intermediate trailing edge flanges between pairs of forwardly extending side trailing edge flanges of the trailing edge ribs wherein the forwardly extending intermediate trailing edge flanges are connected substantially parallel to the panel bodies of the respective basesheet segments by hems, forming forwardly extending intermediate leading edge flanges between pairs of forwardly extending side leading edge flanges of the leading edge ribs wherein the forwardly extending intermediate leading edge flanges are connected substantially parallel to the panel bodies of the respective basesheet segments by jogs, and joining together the leading edge and trailing edge ribs only along the intermediate trailing and leading edge flanges.

12. A method as claimed in claim 11 wherein the intermediate trailing and leading edge flanges are joined together by resistance welding.

13. A method as claimed in claim 12 wherein the resistance spot welding for each pair of intermediate trailing and leading edge flanges includes:
   placing a copper shunt between and contacting both the intermediate trailing edge flange and the panel body to which the intermediate trailing edge flange is connected by the hem,
   pressing a first electrode against the intermediate leading edge flange,
   pressing a second electrode against the intermediate trailing and leading edge flanges, and
   using the electrodes to weld the pair of intermediate trailing and leading edge flanges together.

14. A method as claimed in claim 13 wherein the resistance welding is resistance spot welding.

15. A method as claimed in claim 12 further comprising before the resistance welding, forming rolled over tabs of the side leading edge flanges, the rolled over tabs being bent inwardly towards the panel bodies.

16. A method as claimed in claim 15 wherein the resistance spot welding for each pair of intermediate trailing and leading edge flanges includes:
   placing a copper shunt between and contacting both the intermediate trailing edge flange and the panel body to which the intermediate trailing edge flange is connected by the hem,
   pressing a first electrode against the intermediate leading edge flange,
   pressing a second electrode against the intermediate trailing and leading edge flanges, and
   using the electrodes to weld the pair of intermediate trailing and leading edge flanges together.

17. A method as claimed in claim 16 wherein the resistance welding is resistance spot welding.

* * * * *